Patented Feb. 23, 1954

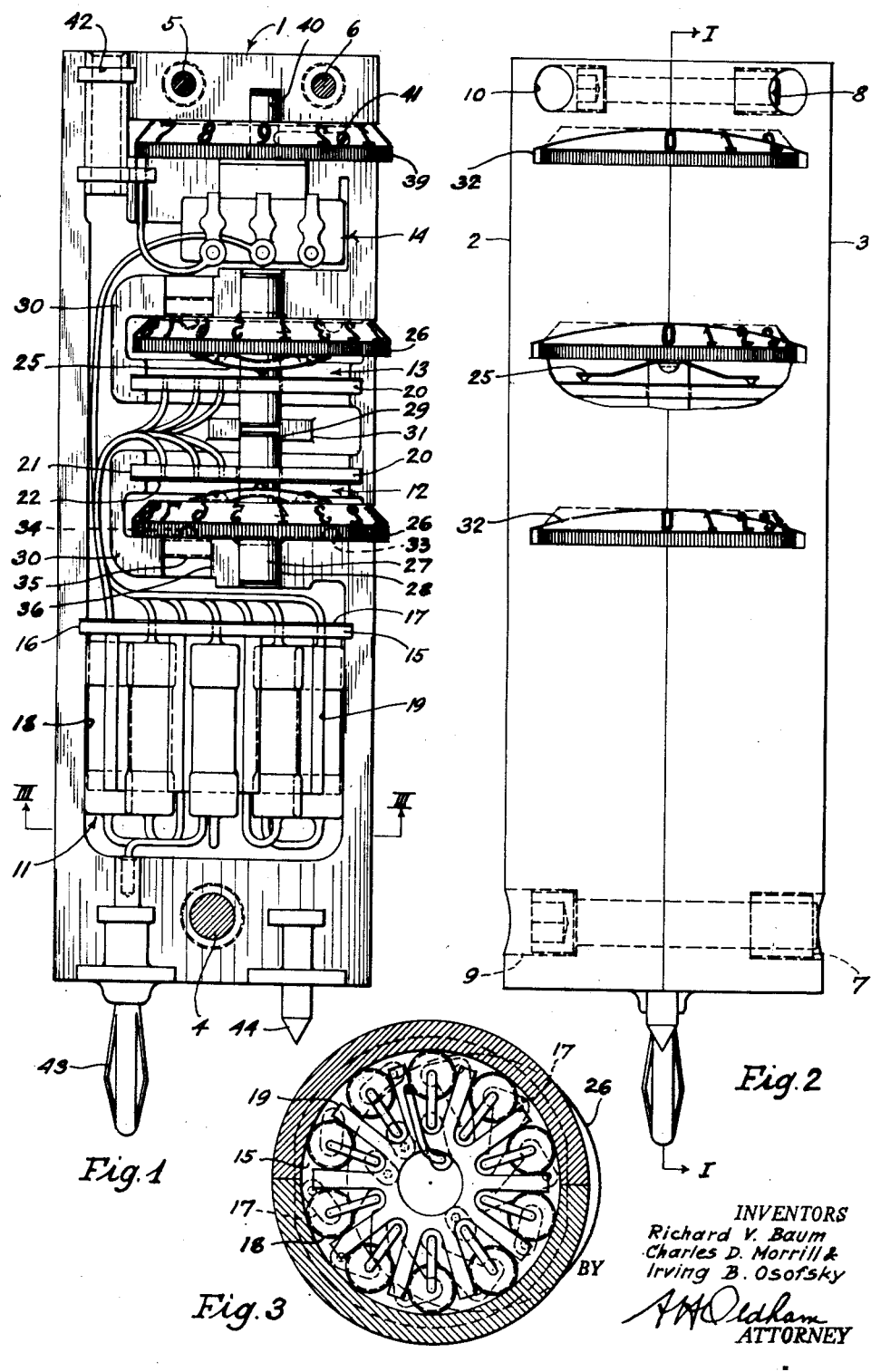

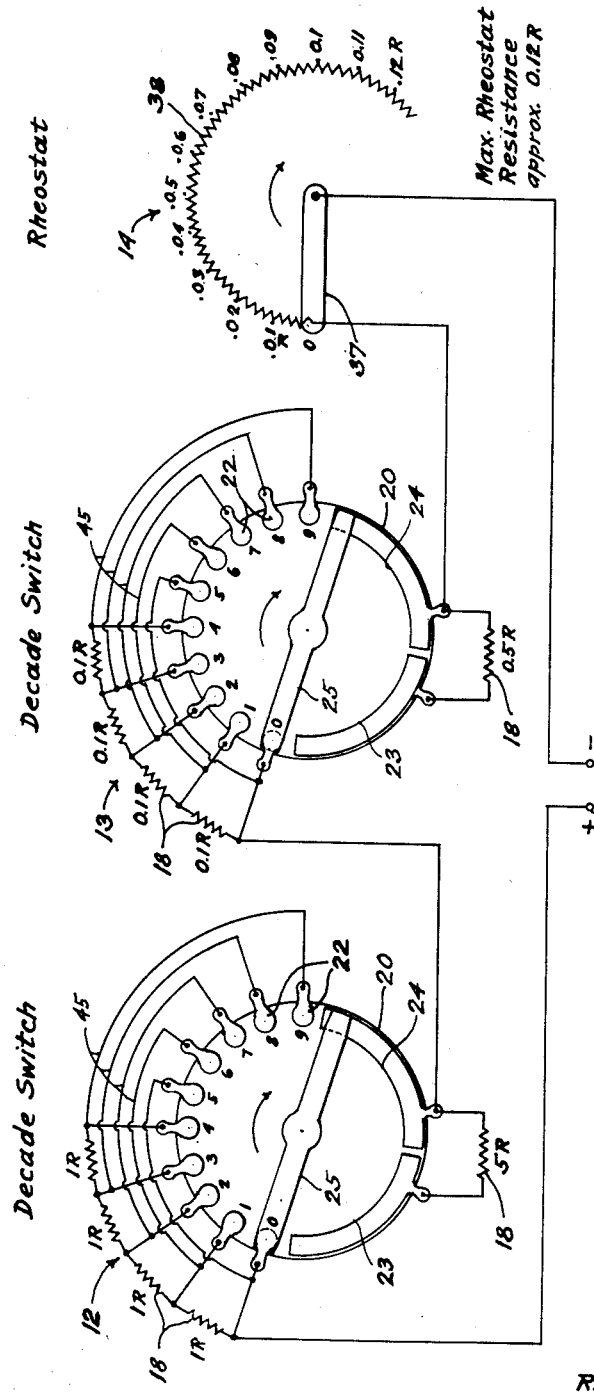

2,670,422

UNITED STATES PATENT OFFICE 2,670,422

ELECTRIC PLUG IN DECADE RESISTANCE UNIT

Richard V. Baum, Akron, Charles D. Morrill, Cuyahoga Falls, and Irving B. Osofsky, Akron, Ohio, assignors to Goodyear Aircraft Corporation, Akron, Ohio, a corporation of Delaware Application September 15, 1952, Serial No. 309,716

7 Claims. (Cl. 201—48)

This invention relates to a variable electric decade resistance unit and in particular to a plug-in variable resistance device, capable of conveniently selecting within its range and without the use of a measuring device a desired resistance value.

Heretofore, devices have been known using a plurality of decade switches for selecting for an electric circuit the required resistance. However, such devices could not be set with an accuracy required for certain purposes because the stop values obtainable by a decade switch are fixed and are not adjustable for values therebetween. Besides, these instruments are too bulky and in many cases can not be used because of lack of space. Another disadvantage is their more complicated construction and high cost.

It is the general object of the invention to avoid and overcome the foregoing and other difficulties of and objections to prior art practices by the provision of making the device as simple and as compact as possible at greatest accuracy for obtaining a desired resistance value.

Another object of the invention is the possibility of assembling all armature parts of the device outside its housing and to mount them in assembled operable condition in the housing without any additional fastening except by closing the housing.

Another object of the invention is the provision for connecting the device with an electric conductor by the plug-in system.

A further object of the invention is to reduce the device to a size which permits large numbers of them to be installed in a small space of an apparatus.

A still further object of the invention is to make setting and reading of the resistance values easy.

The aforesaid objects of the invention, and other objects which will become apparent as the description proceeds are achieved by mounting in an oblong cylindrical split housing and longitudinally thereof in consecutive order and with compactness the operating parts of the device consisting of a resistor assembly, a plurality of decade switches and a rheostat, one end of the housing being provided with a jack and its other end with a plug. All armature parts of the device may be fully assembled and tested outside the housing to be readily insertable therein for use. This cylindrical and compact construction makes it possible to install the device with greatest ease and in large numbers, as, for instance, in an electronic computer, within a very small space by a simple plug-in process. Without the use of a measuring device any resistance value within the range of this unit can be obtained with an accuracy of approximately 1 per cent, whereas with the use of a measuring device, because of the adjustability of the rheostat an accuracy of the unit may be obtained even within 0.1 per cent of its maximum resistance. This device can provide ranges of resistance not available in small accurate potentiometers and can be made in sizes of approximately 1⅜″ diameter and 3½″ in length.

For a better understanding of the invention reference should be had to the accompanying drawings, wherein:

Fig. 1 is a longitudinal cross-sectional view taken on line I—I of Fig. 2 of one embodiment of the invention with the inside parts shown in view.

Fig. 2 is a side view of the device, partly broken away.

Fig. 3 is a cross-sectional view taken on line III—III of Fig. 1, and

Fig. 4 is an electric circuit diagram of the device.

With specific reference to the form of the invention illustrated in the drawings the numeral 1 indicates in general a cylindrical housing made of plastics which consists of two symmetrical halves 2 and 3 enclosing the armature of the resistance unit. These halves are secured together by cap bolts 4, 5 and 6 and nuts 7 and 8 with the bolt caps and nuts hidden for smooth appearance in sockets 9 and 10. The housing 1 contains a resistor assembly 11, a decade switch 12 for the selection of high resistances, a second decade switch 13 for selecting resistances of only one tenth the value of those selected by switch 12 and a linear potentiometer or rheostat 14 for selecting resistances of one tenth of the value of those selected by switch 13, all indicated as a whole, respectively.

The resistor assembly 11 is composed of retainer plate 15 inserted in a groove 16 of the housing 1 and provided at one side with spaced thin metal layers 17 of suitable configuration. On the retainer plate 15 are mounted on a circle, and parallel with the housing axis, precision resistors 18, ten in number, the wires of which pass through the plate 15 and are soldered to the metal layers 17. A spider-like separator 19, made of plastic slipped into spaces between the resistors 18 to insulate them, keeps the resistor 18 properly spaced from each other. Five of the resistors 18, four of which have a resistance of 1 R and the remaining one of 5 R, are wired to the decade switch 12, and the other five resistors 18, four of which having resistances of 0.1 R and one of 0.5 are wired to the decade switch 13 in series with switch 12 and is also connected in series with the rheostat 14 which allows the selection of resistance values one tenth of those selected by the decade switch 13.

The decade switch 12 consists of a switch plate 20, made of plastics, held in a groove 21 and is provided, shown diagrammatically in Fig. 4, with thin metal layers forming spot contacts 22 placed in a half circle and opposite thereof two spaced quadrant contacts 23 and 24 on which rides the switch contactor 25 fastened to the knurled thumb wheel 26 of frusto-conical shape provided with index numbers 0 to 9, corresponding to the R-values obtainable from the group of four 1 R and one 5 R resistors. The thumb wheel 26, made of plastics and being integral with its shaft 27, is journaled in bearings 28 and 29 placed in the transverse portions 30 and 31 in the housing halves 2 and 3. The axis of the bearings 28 and 29 is spaced from and parallel to the longitudinal axis of casing 1 so that for turning the wheel 26 it passes through a slot 32 and partially extends with its circumference beyond the circumference of the housing 1. The side of the thumb wheel 26 opposite the contacts 22, 23 and 24 is provided with dimples 33 corresponding with the number of spot contacts 22. The dimples 33 are engaged by a protuberance 34 on a flat spring 35 seated in a slot 36 in the transverse portion 30 to provide sensory indexing.

The decade switch 13 mounted on the same axis as decade switch 12 is of substantially the same construction and, therefore, does not require separate description.

Having also its axis common with that of the decade switches 12 and 13, the linear potentiometer 14 of standard type having a wiper arm 37 turning about the center of the rheostat resistance 38 and in contact therewith is operated by the thumb wheel 39 fixed to the shaft 40 by a screw 41 and indexed by numbers 1 to 12 for resistances of one tenth the value of those obtained by the decade switch 13 and which is wired to a jack 42 inserted at one end of the resistance unit, whereas, its other end is provided a plug 43 wired to the resistance assembly 11. A pin 44 of the housing 1 secures the resistance unit against turning in plugged-in position if desirable.

As shown in Fig. 1, the entire armature of the device can be completely assembled and tested outside its housing and readily inserted therein without requiring special fastening means, since the bolts holding the housing halves 2 and 3 together also keep all parts enclosed therein in proper place.

The circuit diagram, Fig. 4, of the plug-in resistance unit clearly shows the wiring of this unit with all switches in zero position. By turning the thumb wheel 26 of decade switch 12 in the direction of the arrow the four resistors 1 R are consecutively added to each other to a 4 R resistance with the contactor 25 sliding along the quadrant contact 24. By further turning the thumb wheel 26 the contactor 25 disengages the 1 R resistors and passes the current over the spot contact 5 and quadrant contact 23 through resistor 5 R. Because the spot contacts numbered 0 to 4 are connected by jumper wires 45 with the spot contacts numbered 4 to 9, respectively, further turning of thumb wheel 26 adds again the 1 R resistors to the 5 R resistor up to a resistance of 9 R. The decade switch 13 in series with decade switch 12 is connected in the same way to the remaining five resistors, four of which having a resistance of 0.1 R each and the other one a resistance of 0.5 R and control resistances between 0 R and 0.9 R. However, because of the fixed spot contacts, no resistance value which is less than one tenth R can be added or subtracted by the decade switch 13. In order to accomplish this the linear potentiometer 14 indexed for one hundredths of R from 0 R to 0.12 without fixed stops has been added. Thus, it is possible to set the resistance unit without the use of a measuring instrument within an accuracy of one hundredth R which is the accuracy of the resistors 18, however, by using a measuring instrument an accuracy within one thousandth R is obtainable.

In many cases and especially for electronic computers in which a large number of small variable resistance units are needed and must be placed within a small space the invention is of particular value. From the description it will be recognized that the aforementioned objects of the invention have been fully achieved, which provides a plug-in resistance unit of greatest compactness for obtaining resistance values within very small limits of accuracy, of small size and weight, of easy assembly at least labor and low cost. Besides, the resistance values can be combined and read easier from the thumb wheels which are arranged in line, one above the other and close together. Although, the drawings illustrate a decade resistance unit for only two decade switches, a unit for a greater number of decades may be employed.

While certain representative embodiments and details have been shown for the purpose of illustrating the invention, it will be apparent to those skilled in this art that various changes and modifications may be made therein without departing from the spirit or scope of the invention.

What is claimed:

1. A variable electric plug-in decade resistance unit comprising an elongated cylindrical housing made of plastic material including a precision resistor assembly, a plurality of decade switches and a linear potentiometer all wired in series and mounted one above the other within the housing, said decade switches and said potentiometer having a common axis and each being provided for operation with a thumb wheel extending at least partially beyond the outer circumference of the housing, and means secured in the housing and attached to both ends of the resistance wiring for plugging the unit into an electric circuit.

2. A variable electric plug-in decade resistance unit comprising an elongated cylindrical housing consisting of two symmetrical halves joined in a plane passing through the central axis of the housing, transverse bolts for holding said halves together, said housing being provided with transverse supports spaced from each other and having bearing surfaces, a set of armatures comprising an assembly of resistor units of various resistance values, a decade switch wired to a group of said resistor units of high resistance value, a second decade switch wired to another group of said resistor units having one-tenth the resistance of that of said first group, a linear potentiometer indexed for one hundredth of the unit resistance of the first group of resistors and being wired in series with both of said switches and having a common axis therewith, and plug-in means at both ends of the armature, said resistor assembly, decade switches, potentiometer and plug-in means all assembled and tested outside said housing and fitting into said bearing surfaces and being held therebetween in operating position solely by said bearing surfaces.

3. A variable electric plug-in decade resistance unit comprising an elongated substantially cylindrical housing made of two longitudinal halves, said housing halves being provided with transverse supports having bearing surfaces, transverse bolts for holding said halves together, and a set of a completely assembled operating armature including an assembly of resistor units having various resistance values and being arranged in a circle, a plurality of thumb wheel-operated decade switches, a linear thumb wheel-operated potentiometer, and plug-in means, all of which being wired in series, said decade switches and said potentiometer, one disposed above the other, having a common axis parallel to but spaced from the longitudinal housing axis, with all parts of the armature being embedded and fixed in operating and working order between said bearing surfaces and with portions of the thumb wheels of the switches and potentiometer protruding beyond the outer surface of the housing for operating the thumb wheels.

4. An electric decade resistance unit including substantially ten spot contacts positioned substantially uniformly through about a half circle, an arcuate contact extending through approximately a third quarter of the circle, a second arcuate contact extending through approximately the fourth quarter of the circle, all contacts being spaced from each other, a contactor blade pivotal about the center of the circle and adapted to contact one of the spot contacts at one end and one of the arcuate contacts at its opposite end, a one-unit resistance connected between each of the first five spot contacts, a five-unit resistance connected between the arcuate contacts, a jumper wire connecting each of the first and the sixth, the second and seventh, the third and the eighth, etc., of the spot contacts, and leads connected to the first of the spot and arcuate contacts whereby rotation of the contactor blade connects into the leads from zero to nine units of resistance.

5. In an electric decade resistance device comprising two decade resistance units as described in claim 4, being connected in series, one of said units having resistances of a value of one tenth of those used in the other unit, and a linear potentiometer connected in series with said units and having a total resistance equal to about one eighth of a resistance connected between the spot contacts of the unit having the smaller resistance of the two units.

6. In an electric resistance device composed of a plurality of decade resistance units as described in claim 4, said units being connected in series and each of said units having a resistance value one decade different from the preceding one.

7. A multiple resistance unit having a plurality of spot contacts divided into two groups, a pair of arcuate contacts, contact arms moving over any one of a first group of spot contacts and over one of the arcuate contacts, said contact arms being also movable over any one of the second group of spot contacts and over the second arcuate contact, jumper wires connecting the first spot contact of the first group to the first spot contact of the second group, the second spot contact of the first group to the second spot contact of the second group, etc., a resistor associated with each spot contact of the first group, and a multiple unit resistor equal in units to the number of spot contacts in the first group and connected between the arcuate contacts.

RICHARD V. BAUM.
CHARLES D. MORRILL.
IRVING B. OSOFSKY.

References Cited in the file of this patent

UNITED STATES PATENTS

| Number | Name | Date |
|---|---|---|
| 1,441,399 | Clark | Jan. 9, 1923 |
| 2,142,355 | Hastings | Jan. 3, 1939 |
| 2,264,033 | Youhouse | Nov. 25, 1941 |

FOREIGN PATENTS

| Number | Country | Date |
|---|---|---|
| 534,251 | Great Britain | Mar. 3, 1941 |